Patented Aug. 1, 1933

1,920,619

UNITED STATES PATENT OFFICE 1,920,619

LAMINATED GLASS AND PROCESS OF MAKING IT

John C. Zola, Tarentum, Pa., assignor to Duplate Corporation, a Corporation of Delaware No Drawing. Application March 3, 1931
Serial No. 519,898

4 Claims. (Cl. 49—81)

The invention relates to laminated or safety glass which ordinarily consists of two sheets of glass cemented by a suitable binding material to the opposite sides of a sheet of tough reinforcing material, such as cellulose ester plastic of which celluloid is a common example. Among the cements or binders heretofore used are the so-called glyptal resins, such resins comprising the condensation products of a polyhydric alcohol with a polybasic acid. Unmodified resins of this type when used as cements, have in general certain favorable characteristics, one of which is that the sheets will not separate due to the absorption of moisture by the cement, but have certain undersirable properties when used in the manufacture of safety glass, one of the objections to the resins being their tendency to polymerize and become brittle and lose their holding power in the course of time. They also have the property of acting as plasticizers or solvents of the cellulose plastic and are themselves not soluble in non-solvents of cellulose ester plastic. I have found that resins of this kind can be improved for the desired purpose; made soluble in non-solvents of cellulose ester plastic solvents; and made non-solvents of cellulose plastic by the use of fat or fatty acid or oil in certain proportion during the polymerization of the resins.

The following formulæ set forth in five examples of proportions of ingredients required to form modified polyhydric alcohol polybasic acid condensation resins:

Example #1

| | Parts |
|---|---|
| Glycerol | 94 |
| Phthalic anhydride | 148 |
| Fatty acids (obtained from soya bean oil) | 120 |

Example #2

| | Parts |
|---|---|
| Glycerol | 94 |
| Phthalic anhydride | 148 |
| Fatty acids from castor oil | 40 |
| Corn oil | 100 |

Example #3

| | Parts |
|---|---|
| Glycerol | 94 |
| Phthalic anhydride | 123 |
| Fatty acids (obtained from linseed oil) | 210 |

Example #4

| | Parts |
|---|---|
| Glycerine | 92 |
| Phthalic anhydride | 185 |
| Oleic acid | 141 |
| China wood oil | 20 |

Example #5

| | Parts |
|---|---|
| Glycerol | 92 |
| Phythalic anhydride | 175 |
| Butyric acid | 44 |
| China wood oil acids | 50 |
| Soya bean oil | 50 |

The amounts of phthalic anhydride and of fatty acid are interchangeable according to their acid equivalents: one mol. of phthalic being equivalent to 2 mols. of fatty acide, or 2/3 mol. of oil, where it is used as the source of fatty acid. The proportions used need not necessarily be molecular quantities, since certain advantageous effects either in the preparation or in the final product may be obtained by using an excess of one or two ingredients.

Other monobasic acids, such as benzoic, propionic, butyric, lactic, salicylic, their analogues or substitution products, can be used in place of the fatty acids from oil or polybasic acid to esterify part of the hydroxyl groups of the polyhydric alcohol. Likewise, polyhydric ethers, such as the polyglycerols and diethylene glycol, or the ether derivatives of a polyhydric alcohol, such as mono-ethyl-ether of glycerol, may be used in place of part or all of the polyhydric alcohol. Examples of other polyhydric alcohols are glycol and mannitol, and of other polybasic acids, succinic, sebacic, tartaric, citric, malic, maleic and lactic.

Among the non-solvents of cellulose ester plastic which may be used as solvents of the above resins are the following: heavy coal tar naphtha, tuluol, benzol, xylol, carbon tetrachloride, cumene and ethyl benzene. The proportion of resin to solvent ranges from two to twenty parts in one hundred. In applying the cement, the resin is dissolved in the solvent and sprayed onto the faces of the glass sheets in a thin film or coat. This film is allowed to dry out in part or in whole after which the sheets are assembled and subject to heat and pressure following the usual practice in laminating safety glass, the temperature preferably being between 200 and 250 degrees F. and the pressure being about 150 pounds per square inch. If desired, the solvent used may be made up of a mixture of several solvents.

What I claim is:

1. A laminated plate comprising a glass sheet, a sheet of cellulose ester plastic and a binder between the sheets comprising a polyhydric alcohol polybasic acid condensation resin having incorporated therein during polymerization a glycerol ester of a fatty acid.

2. A laminated plate comprising a glass sheet, a sheet of cellulose ester plastic and a binder between the sheets comprising a polyhydric alcohol polybasic acid condensation resin having therein a sufficient quantity of glycerol ester of a fatty acid to make the resin a non-solvent of the cellulose ester plastic.

3. A process of laminating a sheet of glass and a sheet of cellulose ester plastic which consists in dissolving a resin of the glycerol polyhydric acid condensation type having therein a sufficient quantity of glycerol ester of a fatty acid to make the resin non-solvent of the cellulose ester plastic in a body of solvent, applying a coating of the mixture to the surface of one of said sheets permitting the solvent to dry out in part at least and then assembling the sheets and applying heat and pressure thereto.

4. A process of laminating a sheet of glass and a sheet of cellulose ester plastic which consists in dissolving a resin of the glycerol polyhydric acid condensation type having incorporated therein during polymerization a glycerol ester of a fatty acid in a body of solvent, which is a non-solvent of cellulose ester plastic, permitting the solvent to dry out in part at least, and then assembling the sheets and applying heat and pressure thereto.

JOHN C. ZOLA.